United States Patent
Chen et al.

(10) Patent No.: US 11,939,498 B2
(45) Date of Patent: Mar. 26, 2024

(54) WATER BORNE DRY LAMINATION BONDING AGENT WITH HEAT RESISTANCE IMPROVEMENT

(71) Applicants: DOW GLOBAL TECHNOLOGIES LLC, Midland, MI (US); ROHM AND HAAS COMPANY, Philadelphia, PA (US)

(72) Inventors: Mai Chen, Chicago, IL (US); Yuanjia Pan, Shanghai (CN); Xinhong Wang, Shanghai (CN); Gaobing Chen, Shanghai (CN); Xinchun Liu, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 521 days.

(21) Appl. No.: 16/604,368

(22) PCT Filed: Apr. 11, 2017

(86) PCT No.: PCT/CN2017/080065
§ 371 (c)(1),
(2) Date: Oct. 10, 2019

(87) PCT Pub. No.: WO2018/187935
PCT Pub. Date: Oct. 18, 2018

(65) Prior Publication Data
US 2020/0123425 A1  Apr. 23, 2020

(51) Int. Cl.
C09J 193/04 (2006.01)
B32B 7/12 (2006.01)
C09J 5/00 (2006.01)
C09J 133/06 (2006.01)

(52) U.S. Cl.
CPC .............. *C09J 193/04* (2013.01); *B32B 7/12* (2013.01); *C09J 5/00* (2013.01); *C09J 133/062* (2013.01); *C09J 2433/00* (2013.01); *C09J 2475/00* (2013.01); *C09J 2493/00* (2013.01)

(58) Field of Classification Search
CPC ....... C09J 175/04; C09J 125/14; C09J 193/04
See application file for complete search history.

(56) References Cited

U.S. PATENT DOCUMENTS

| | | | | |
|---|---|---|---|---|
| 3,232,895 A | * | 2/1966 | Tyran | C09J 191/06 |
| | | | | 106/230 |
| 7,220,338 B2 | * | 5/2007 | Chen | C08G 18/4063 |
| | | | | 156/331.7 |
| 7,414,091 B2 | * | 8/2008 | Chen | C08G 18/6254 |
| | | | | 524/589 |
| 2007/0072992 A1 | | 3/2007 | Chen et al. | |
| 2008/0033095 A1 | * | 2/2008 | Takahashi | C09J 133/08 |
| | | | | 524/460 |
| 2011/0135936 A1 | | 6/2011 | Katsuta et al. | |
| 2014/0002383 A1 | | 1/2014 | Hsieh et al. | |
| 2015/0147502 A1 | | 5/2015 | Lindenmuth et al. | |
| 2017/0267903 A1 | | 9/2017 | Kamai | |

FOREIGN PATENT DOCUMENTS

| | | | | |
|---|---|---|---|---|
| CN | 1940001 B | 5/2010 | | |
| CN | 101182405 B | 9/2011 | | |
| CN | 102433087 B | 7/2013 | | |
| CN | 104263308 A | 1/2015 | | |
| CN | 106433541 A | 2/2017 | | |
| CN | 107001574 A | 8/2017 | | |
| CN | 108219714 A | * | 6/2018 | ............. B27N 3/002 |
| CN | 108219714 A | 12/2019 | | |
| EP | 645439 A2 | 3/1995 | | |
| EP | 1770138 B1 | 1/2008 | | |
| JP | H07-157742 A | 6/1995 | | |
| JP | 10-194449 A | 7/1998 | | |
| JP | 2001-200029 A | 7/2001 | | |
| JP | 2003-064341 A | 8/2008 | | |
| JP | 2007-092009 A | 4/2010 | | |
| JP | 2017-110126 A | 6/2017 | | |
| JP | 2015-120819 A | 10/2017 | | |
| WO | 2012035059 A1 | 3/2012 | | |
| WO | 2015/190276 A1 | 12/2015 | | |

OTHER PUBLICATIONS

PCT/CN2017/080065, International Search Report and Written Opinion dated Jan. 23, 2018.
PCT/CN2017/080065, International Preliminary Report on Patentability dated Oct. 15, 2019.
MX/a/2019/012127, Office Action dated Jun. 19, 2023 with accompanying English Translation.

* cited by examiner

*Primary Examiner* — Michael M Dollinger
(74) *Attorney, Agent, or Firm* — Boyle Fredrickson S.C.

(57) ABSTRACT

The present disclosure is directed to a two-component bonding agent composition and a process for applying a layer of the bonding agent composition to substrate layers to make laminates.

19 Claims, No Drawings

WATER BORNE DRY LAMINATION BONDING AGENT WITH HEAT RESISTANCE IMPROVEMENT

FIELD OF THE DISCLOSURE

The present disclosure relates to a two-part acrylic-urethane bonding agent employing a water borne acrylate/urethane hybrid composition. The disclosure is particularly suited for use as a laminating adhesive and is suitable, for example, for laminating flexible films, aluminum foil and other substrates.

INTRODUCTION

Solvent-based polyurethane has been widely used as a laminating adhesive to achieve good heat and moisture resistance. In recent years it has become desirable to expand the selection of commercially available bonding agents (including, for instance, adhesives and primers) to meet the ever-rising number of new technological applications. The desire to reduce chemical solvent emissions and to improve ease of handling has driven the demand for improved water borne bonding agent systems. One such system that has been popular in widespread applications is a latex system; that is, a water borne dispersion or emulsion. Particularly attractive have been acrylic latex systems.

However, current water-based adhesives can hardly meet the requirements of medium-performance high-demand packages like zipper insertions, and standup pouches, limited by their heat resistance.

It is desired to provide a water borne adhesive with improved heat resistance.

SUMMARY OF THE DISCLOSURE

The present disclosure is directed to a two-component bonding agent composition, comprising: (a) a first component which is an aqueous mixture whose solid portion comprises: (i) 0.1% to 10% of a polyol containing at least two hydroxyl groups and being selected from the group consisting of water dispersible polyether polyols, polyester polyols, polyether polyester polyols and mixtures thereof, (ii) 3% to 32% of a rosin resin, and (iii) 58% to 96% of a polymer having from 20-60% residues of at least one styrene monomer, from 40-80% residues of at least one acrylic monomer having a Tg less than 0° C., from 1-4% residues of (meth)acrylic acid and less than 0.5% residues of hydroxyl-containing monomers; and (b) a second component comprising a water dispersible polyisocyanate; wherein said second component is present relative to said first component at a NCO/NCO-reactive group molar ratio of 1:1 to 8:1. The disclosure is further directed to a process for producing a coating on a substrate. The process comprises applying a layer of the bonding agent composition.

DETAILED DESCRIPTION OF THE DISCLOSURE

The composition and method of the present disclosure allow lamination of two or more flexible or rigid substrates. This disclosure relates to a two-part, aqueous bonding agent composition which is hydrophobic and contains aromatic monomer residues. Part one comprises a rosin resin, and a copolymer of a styrene-type monomer, a hydrophobic acrylic monomer and a carboxyl functional acrylic monomer. In some embodiments, the content of hydroxyl functional acrylic monomers is severely limited in this disclosure. Water dispersible or water soluble polyol is blended into part one to provide hydroxyl groups for crosslinking with part two, which comprises a water dispersible polyisocyanate.

The two parts are mixed prior to contacting a surface (such as when applied on a laminating machine). The bonding agent is applied to one substrate and preferably dried through an oven before another layer of substrate is applied. The laminate can then be cured, for instance, at ambient temperature. The polyol in the latex preferably cures with the polyisocyanate to form a hybrid system of an acrylic copolymer and a urethane. The copolymer helps to achieve the desired heat and moisture resistance at elevated temperature.

The resulting bonding agent exhibits excellent heat, chemical and environmental resistance, as well as adhesion over a wide range of temperatures (e.g., preferably from at least −10° C. to +120° C.) and humidities. The bonding agent preferably has a useful pot life after mixing of more than 8 hours, and is easy to handle and apply. In some embodiments, the bonding agent is contacted with a first substrate and a second substrate is also contacted with the bonding agent to form a laminate. The bonding agent has excellent mechanical stability at high speed.

All percentages mentioned herein are by weight, and temperatures in ° C., unless specified otherwise. As used herein, "bonding agent" is an agent that is suitable for joining itself to at least a first material, and preferably also to a second material. The first and second materials may be the same or different. Multiple layers of material may be joined using the bonding agent. "Bonding agent" encompasses an adhesive, a primer, or any other suitable coating for bonding to a surface. As used herein the terminology "(meth)acrylate" refers to acrylate or methacrylate. "Latex" or "latex composition" refers to a dispersion of a water-insoluble polymer which may be prepared by conventional polymerization techniques such as, for example, by emulsion polymerization. The term "acrylic monomer" means acrylonitrile (AN); acrylamide (AM) and its N-substituted derivatives; acrylic acid (AA), methacrylic acid (MAA), and their esters; and itaconic acid (IA). Esters of AA and MAA include, but are not limited to, methyl methacrylate (MMA), ethyl methacrylate (EMA), butyl methacrylate (BMA), ethylhexyl methacrylate (ERMA), lauryl methacrylate (LMA), hydroxyethyl methacrylate (HEMA), methyl acrylate (MA), ethyl acrylate (EA), butyl acrylate (BA), isobutyl acrylate (IBA), ethylhexyl acrylate (EHA) and hydroxyethyl acrylate (HEA), as well as other esters of AA or MAA. The term "styrene monomer" means an ethylenically unsaturated monomer substituted with an aromatic group, preferably styrene (Sty) and substituted styrenes, e.g., a-methylstyrene (AMS).

The aqueous mixture which is the first component of this disclosure preferably is a latex, which is a water-based dispersion of particles of a polymer of ethylenically unsaturated monomers. The polymer is provided in an amount of from 58-96% of the solid portion of the first component. In some embodiments, the amount of polymer is no more than 95%, or no more than 93%, or no more than 92%, or no more than 90%. In some embodiments, the amount of polymer is at least 56%, or at least 65%, or at least 70%. Other than acrylic and styrene monomers, suitable monomers might include, for example, vinyls (e.g., acetates, such as vinyl acetate, ethylene vinyl acetate; alcohols; chlorides such as polyvinyldichloride, polyvinyl chloride; or the like). The latex will typically exhibit a viscosity ranging from about 10 to 1000 cps and more preferably from 20 to 500 cps. The solids content in the latex may range from 5 to 95%. In some embodiments, it ranges from 20 to 80%, or from 30 to 70%, or from 40 to 60%. In some embodiments, the polymer of the latex has a weight average molecular weight of between 5000 and 2,000,000 or between 100,000 and 2,000,000.

In some embodiments, the polymer has from 20-60% residues of at least one styrene monomer, or no more than 50%. In one embodiment of the disclosure, the polymer has from 23-45% residues of at least one styrene monomer, preferably styrene. The polymer has from 40-80% residues of at least one acrylic monomer having a Tg less than 0° C. In some embodiments, the polymer has from 50-80% residues of at least one $C_4$-$C_{12}$ alkyl acrylate ester monomer. In some embodiments, the $C_4$-$C_{12}$ alkyl acrylate ester monomer(s) is BA, EHA, IBA, LMA, or combinations thereof.

In some embodiments, the polymer has from 1-4% residues of (meth)acrylic acid. In some embodiments, the polymer has from 1-3% residues of (meth)acrylic acid, and most preferably from 1.5-2.5%. In some embodiments, the (meth) acrylic acid residues in the polymer are residues of acrylic acid.

In some embodiments, the polymer has less than 0.5% residues of hydroxyl-containing monomers. In some embodiments, the polymer has less than 0.3% of such residues, or less than 0.2%, or the polymer is substantially free of residues of hydroxyl-containing monomers. Examples of hydroxyl-containing monomers include, e.g., HEMA, HEA, vinyl alcohol, hydroxypropyl methacrylate (HPMA) and hydroxypropyl acrylate. In some embodiments, the polymer is substantially free of amino-containing monomers. In some embodiments, the polymer has less than 0.5% of isocyanate-reactive groups other than carboxylic acid groups, or less than 0.2%, or the polymer is substantially free of isocyanate-reactive groups other than carboxylic acid groups.

It will be appreciated that surfactants may be employed as desired in the bonding agent composition of the present disclosure (e.g., for use in emulsion or dispersion polymerization) to provide stability, as well as to control particle size. Conventional surfactants include anionic or nonionic emulsifiers or their combination. Typical anionic emulsifiers include, but are not limited to alkali or ammonium alkyl sulfates, alkali or ammonium alkylether sulfates, alkali or ammonium alkylarylether sulfates, alkyl sulfonates, salts of fatty acids, esters of sulfosuccinic acid salts, alkyl diphenylether disulfonates, and salts or free acids of complex organic phosphate esters. Typical nonionic emulsifiers include, but are not limited to polyethers, e.g. ethylene oxide and propylene oxide condensates which include straight and branched chain alkyl and alkylaryl polyethylene glycol and polypropylene glycol ethers and thioethers, alkyl phenoxy-poly(ethyleneoxy) ethanols having alkyl groups containing from about 7 to about 18 carbon atoms and having from about 4 to about 100 ethyleneoxy units, and polyoxyalkylene derivatives of hexitol, including sorbitans, sorbides, mannitans, and mannides. Surfactants may be employed in the polymer compositions of the present disclosure at levels of 0.1 to 3 wt. % or greater, based on the total weight of the polymer composition.

The polymer composition is mixed with a water dispersible polyol to provide hydroxyl functionality. A water dispersible polyol is one which will form a solution or emulsion in water at room temperature with agitation at any amount in the range 1-50%. In some embodiments, the polyol may be a polyether polyol, a polyester polyol, polyester polyether polyol or a mixture thereof. A polyol will have multiple hydroxyl functionality and thus will contain at least two hydroxyl groups. Preferred polyols are selected from diols, triols or mixtures thereof. The polyol is sufficiently non-volatile that it will be fully or at least partially available for reaction with the isocyanate during mixing operations. The polyol also is water soluble or water dispersible. In some embodiments, the polyol will have a number average molecular weight from 100 to 7,500, or from 150 to 5,000, or from 200 to 1,000. In some embodiments, the molecular weight is less than 1500, or less than 600. In some embodiments, the polyol is polypropylene glycol (PPG), such as 400 MW polypropylene glycol. In some embodiments, the polyol is provided in an amount of from 0.1-10% of the solid portion of the first component. In some embodiments, the amount of polyol is no more than 5%, or no more than 3%, or no more than 2%, or no more than 1.5%. In some embodiments, the amount of polyol is at least 0.3%, In some embodiments, at least 0.4%, or at least 0.6%. The solid portion of a component is the non-volatile portion, typically comprising polymers and other non-volatile additives, e.g., surfactants, pigments, flame retardants; and excluding water and other solvents.

The polymer latex is further mixed with a rosin resin. The rosin resin may be present in solid or water dispersible. A water dispersible rosin resin is one which will form a solution or emulsion in water at room temperature with agitation at any amount in the range 1-60%. The rosin resins used in the present disclosure are processed by at least one method of a) modification, b) hydrogenation or disproportionation, and c) polymerization or esterification from raw material rosins such as gum rosin, tall oil rosin and wood rosin. Where the rosin resin is processed by at least two methods of the above, the processing order of methods b) and c) is not specifically limited, only that modification method has to be followed, not necessarily directly, by polymerization method if both of them are used. Suitable examples of the rosin resins include modified rosins, hydrogenated rosins, disproportionated rosins and polymerized rosins obtained respectively by modifying, hydrogenating, disproportionating and polymerizing raw material rosins and additionally, rosin esters obtained by esterifying raw material rosins with alcohols or an epoxy compound. Suitable examples of the modified rosins include unsaturated modified rosins obtained by modifying raw material rosins with unsaturated acid, and phenolic modified rosins obtained by modifying raw material rosins with phenols. Suitable examples of the unsaturated acid include acrylic acid, methacrylic acid, fumaric acid and maleic acid. Suitable examples of the phenols include phenol and alkylphenol. The modification method is not specifically limited and a method of mixing raw material rosins with phenols or unsaturated acid and heating them is usually adopted.

Suitable examples of the alcohols for preparing rosin esters from raw material rosins and alcohols include monovalent alcohols such as methanol, ethanol and propanol; divalent alcohols such as ethylene glycol, diethylene glycol, propylene glycol and neopentyl glycol; trivalent alcohols such as glycerin, trimethylol ethane and trimethylolpropane; tetravalent alcohols such as pentaerythritol and diglycerin; and hexavalent alcohols such as dipentaerythritol. Preferably, the alcohol is glycerin, and more preferably, the alcohol is pentaerythritol. The esterification method of the rosin esters is not specifically limited and a method of mixing raw material rosins with alcohols and heating the mixture in the presence of an optional esterification catalyst is adopted. The rosin esters prepared from disproportionated rosins (namely disproportionated rosin esters) and the rosin prepared from polymeric (namely polymeric rosin are preferred).

The rosin resin is provided in an amount of from 3-32% of the solid portion of the first component. In some embodiments, the amount of rosin resin is no more than 30%, or no more than 28%, or no more than 25%, or no more than 20%. In some embodiments, the amount of rosin resin is at least 3%, or at least 6%, or at least 8%.

Acid value and softening point of the rosin resin vary depending on its species. The acid value is usually from 1 to 50 KOH mg/g, or from 1 to 15 KOH mg/g, and the softening point is from 25° C. to 200° C., or from 60° C. to 190° C.

In some embodiments, the molecular weight of the rosin resin is from 1,000 to 50,000, preferably form 2,000 to 10,000.

Other tackifier resins may be used to replace the rosin resin of the present disclosure and achieve similar performances. Suitable examples of other tackifier resins include terpenes and modified terpenes; aliphatic; cycloaliphatic and aromatic resins such as $C_5$ aliphatic resins, $C_9$ aromatic resins, and $C_5/C_9$ aliphatic/aromatic resins; hydrogenated hydrocarbon resins; terpene-phenol resins; and any combination thereof.

Optionally, conventional ionic or non-ionic surfactants can be used in the preparation of the rosin resin. In some embodiments, the surfactant is an anionic surfactant, and suitable examples of the anionic surfactants are selected from sulfonates, phosphates, carboxylates, and any combination thereof. In some embodiments, the anionic surfactant is sulfonates such as alkyl monoester sulfosuccinate and phosphates such as polyoxyethylene nonylphenyl ether branched phosphate.

In some embodiments, in the preparation of the rosin resin, the rosin resin is substantially free of organic solvent, i.e., it contains less than 3%, or less than 2%, or less than 1%, or less than 0.5or less than 0.2%, or less than 0.1% by weight based on total weight of the rosin resin, organic solvent. Solvents which may be present within the stated limits in the rosin resin of the present disclosure are hydrocarbyl solvents, preferably are aromatic solvents, and more preferably are toluene.

The polyisocyanate which is the second component of this disclosure is any suitable polyisocyanate. In some embodiments, the polyisocyanate is an aliphatic polyisocyanate, an aromatic polyisocyanate or a mixture thereof. In some embodiments, the polyisocyanate is a diisocyanate. Examples of suitable polyisocyanates include those based on toluene diisocyanate (TDI), isophorone diisocyanate (IPDI), hexamethylene diisocyanate diphenyl methane diisocyanate (MDI), dicyclohexyl methane diisocyanate (HMDI), isomers thereof or mixtures thereof. Prepolymers of a polyisocyanate and a polyol may also be employed. Aliphatic polyisocyanates are preferred. The polyisocyanate is water soluble or dispersible, i.e., it will form a solution or emulsion in water at room temperature with agitation at any amount in the range 1-50%.

The polyisocyanate is present in the bonding agent at a percent of from 1% to 5% by weight based on the total weight of the first component.

The relative proportions of isocyanate groups to isocyanate-reactive groups may vary as desired, within a molar ratio of NCO/NCO-reactive groups of 1:1 to 8:1. NCO-reactive groups include, e.g., hydroxyl, amino and carboxyl groups. In some embodiments, the NCO/NCO-reactive group molar ratio is at least 3:1. In some embodiments, the NCO/NCO-reactive group molar ratio is no more than 5:1.

In some embodiments, the polyisocyanate is provided in an amount up to 0.01 to 0.8 (and more preferably 0.1 to 0.3) parts polyisocyanate to 1 part solids in the latex, with the polyol present in the above preferred proportions relative to the isocyanate groups. The pH of the resulting overall mixture preferably is 5 to 9 and more preferably is 6 to 8.

Other optional components of the binding agents of the present disclosure include, but are not limited to, agents selected from co-solvents, coalescing agents, pigments or other colorants, fillers, reinforcement (e.g., fibers), dispersants, wetting agents, waxes, catalysts, blowing agents, anti-foam agent, UV absorbers, flame retardants, adhesion promoters, antioxidants, biocides, coalescing agents, or stabilizers. These optional components (as desired) may be added in any order of addition that does not cause an incompatibility between components. Components that do not dissolve in the aqueous carrier (such as pigments and fillers) can be dispersed in the latex or an aqueous carrier or co-solvent using a mixer (optionally a high shear mixer). The pH of the composition can be adjusted by adding acid or base, with agitation. Examples of base include, but are not limited to ammonia, diethylamine, triethylamine, dimethylethanolamine, triethanolamine, sodium hydroxide, potassium hydroxide, and sodium acetate. Examples of acids include, but are not limited to, acetic acid, formic acid, hydrochloric acid, nitric acid, and toluene sulfonic acid.

As gathered from the foregoing, the system of the present disclosure contemplates the employment of two components, which preferably are mixed using a suitable mixer (e.g., an electrically, pneumatically, or an otherwise powered mechanical mixer) prior to or during application to a substrate to form the bonding agent. Thus, the latex/polyol admixture typically will be packaged separately from the polyisocyanate. Mixing may take place at any suitable time in the process, such as before, during, or as a result of the application process. All of the present steps may be carried out under ambient room temperature conditions. As desired, heating or cooling may be employed.

The bonding agent of the present disclosure is useful for bonding substrates together. The substrates may be similar material or dissimilar material. Though wet lamination processes are possible, preferably the bonding agent is particularly useful for dry bond lamination of a plurality of substrate layers. In a preferred embodiment, a layer of the bonding agent is applied to a first substrate layer, water is removed (e.g., with heated air or otherwise), and the resulting dried bonding agent layer is covered with a second substrate layer to form a laminated article wherein the two substrates are bonded together by the dried layer of bonding agent. In a preferred embodiment, the substrate layers are provided in the form of rolls of substrate material. The sheets may be on the order of 1 to 10 mils in thickness. Larger thicknesses are also possible, as are smaller thicknesses (e.g., on the order of 1 or more microns).

The compositions of the present disclosure can be applied to desired substrates using conventional application techniques such as rotogravure printing, flexographic printing, conventional or airless spray, roll coating, brush coating, wire wound rod coating, knife coating, or coating processes such as curtain-, flood-, bell-, disc-, and dip-coating processes. Coating with the bonding agent may be done over an entire surface or only a portion of it, such as along an edge, or at intermittent locations. Once applied to the substrate, the compositions are dried, such as by application of heat and air flow, or some other suitable approach for removing substantially all remaining water.

The present disclosure benefits from advantageously long pot lives of the bonding agent. Thus, after the components of the bonding agent are mixed, it is contemplated that several hours may be permitted to elapse before application to a substrate. For example, in one embodiment the useful life is at least 8 (and more preferably at least 12 to 24) hours and thus at least eight hours may elapse before application to a substrate.

The bonding agent compositions may find other suitable application as top coats, or other intermediate coats, thus rendering them potentially useful in paints, inks, plastics, or the like. The bonding agent compositions of the present disclosure can be used on a wide variety of one or a plurality of suitable substrates such as high, low or medium density plastics (for example, of a type selected from polystyrene, polyethylene, ABS, polyurethane, polyethylene terephthalate, polybutylene terephthalate, polypropylene, polyphenylene, polycarbonate, polyacrylate, polyvinyl chloride, polysulfone or mixtures thereof), paper, wood and reconstituted wood products, polymer coated substrates, wax coated paperboard, cardboard, particle board, textiles, leather, and metal (aluminum, ferrous as well as other non-ferrous), metallized plastics (e.g., metallized plastic film) or the like. The bonding agent is particularly attractive for packaging and sealing applications. For example, in one aspect, a plastic film, metal film, or metallized plastic film is laminated (e.g., over all or at least a portion of its surface, such as along its edges, or at intermittent locations) with the bonding agent of the present disclosure. In one such application, food may be packaged for boil-in-bag preparation, or the resulting laminate might be used for sealing or packaging some other article.

EXAMPLES

I. Raw Materials

Films: Substrates used in the Examples include biaxially oriented polypropylene film (BOPP, thickness 18 μm), vacuum metallized casted polyethylene terephthalate polyester film (VMPET, thickness 12 μm) films, and polyethylene film (PE, thickness 60 μm) as commercially obtained from Guangdong Nan Cheng Company.

Ingredients used in the Examples include those listed in Table 1 below.

TABLE 1

Ingredients Used In Examples

| Ingredients | | Commercial name | Solids | Supplier |
|---|---|---|---|---|
| Acrylic copolymer | | BA-Styrene copolymer of 60% BA monomer and 38% styrene monomer | 44.0% | Dow |
| Polyol | | Polyether diol | 100% | Dow |
| Hard resin | Rosin | SUPER ESTER ™ E-865NT | 50.0% | Arakawa |
| | Poly-olefin | HORDAMER ™ PE35 | 37.5% | BYK |
| | | AQUACER ™ 593 | 30.0% | BYK |

TABLE 1-continued

Ingredients Used In Examples

| Ingredients | Commercial name | Solids | Supplier |
|---|---|---|---|
| Poly-isocyanate | COREACTANT CR 3A | >99.8% | Dow |

II. Test Methods

The water based adhesives and BOPP, VMPET, PE films are used without any pre-treatment. The adhesives are coated to BOPP films and combined with VMPET films to obtain BOPP/VMPET 2-layer laminates in an amount of 2.0 g/m² by dry weight and dried. The 2-layer laminates are then coated with the water based adhesives in an amount of 2.0 g/m² by dry weight and combined with PE films to obtain BOPP/VMPET/PE 3-layer laminates. The BOPP/VMPET/PE 3-layer laminates are cured at 50° C. for 2 days and then tested.

i) Bond Strength (BS):

The laminates of the present disclosure are cut into 25 mm width×10 cm length strips using metal stencil for T-peel test under 250 mm/min crosshead speed using a 5943 Series Single Column Table Top System available from Instron Corporation. During the test, the tail of each strip is pulled slightly by fingers to make sure the tail remained 90 degrees to the peeling direction. Three strips for each sample are tested and the average value is calculated. Results are in the unit of N/15 mm. The higher the value is, the better the bond strength is.

ii) Heat Seal Strength (HS)

The laminates are heat-sealed in a HSG-C Heat-Sealing Machine available from Brugger Company under 140° C. seal temperature and 300N pressure for 1 second (or under 220° C. seal temperature and 300N pressure for 0.5 second), then cooled down and cut into 25 mm width×10 cm length strips for heat seal strength test under 250 mm/min crosshead speed using a 5943 Series Single Column Table Top System available from Instron Corporation. Three strips for each sample are tested and the average value is calculated. Results are in the unit of N/15 mm. The higher the value is, the better the heat seal strength is.

III. Examples:

470.25 g of acrylic copolymer emulsion (BA-Styrene copolymer with solids of 44%) is placed in a 1 liter bottle with a magnetic stirrer, then 4.75 g of polyol (polyether diol) and 25 g of SUPER ESTER™ E-865NT rosin resin are poured into the bottle and stirred for 20 minutes. When the blending composition is distributed, 10 g of COREACTANT CR 3A polyisocyanate is drop added into the mixture emulsion and the mixture is stirred for another 20 minutes.

Illustrative Adhesive Examples IE1, IE2, IE3 and IE4, and Comparative Adhesive Examples CE1, CE2 and CE3 are prepared with the ingredients listed in Table 1. The same blending process as described above is repeated for each Example but with ingredients according to the compositions listed in Table 2.

TABLE 2

Example Compositions

| | CE1 | IE1 | IE2 | IE3 | IE4 | CE2 | CE3 |
|---|---|---|---|---|---|---|---|
| BA-Styrene copolymer | 98% | 88.2% | 78.4% | 94% | 68.6% | 88.2% | 88.2% |
| Polyether diol | 2% | 1.8% | 1.6% | 1% | 1.4% | 1.8% | 1.8% |
| SUPER ESTER ™ E-865NT | — | 10% | 20% | 5% | 30% | — | — |
| HORDAMER ™ PE35 | — | — | — | — | — | 10% | — |

TABLE 2-continued

| | Example Compositions | | | | | | |
|---|---|---|---|---|---|---|---|
| | CE1 | IE1 | IE2 | IE3 | IE4 | CE2 | CE3 |
| AQUACER ™ 593 | — | — | — | — | — | — | 10% |
| COREACTANT CR 3A* | 2% | 2% | 2% | 2% | 2% | 2% | 2% |

*% based on the total weight of component A.

Illustrative Adhesive Examples IE1, IE2 and Comparative Adhesive Example CE1 are each coated to VMPET and PE60 films to obtain VMPET/PE60 2-layers laminates for further tests.

Illustrative Adhesive Examples IE1, IE2, IE3 and IE4, and Comparative Adhesive Example CE1, CE2 and CE3 are each coated to BOPP, VMPET and PE60 films to obtain BOPP/VMPET/PE60 laminates for further tests.

IV. Results

As shown in Table 3, Illustrative Adhesive Examples IE1 and IE2 have significantly improved seat seal strength at 140 and 220° C., compared to that of Comparative Adhesive Example 1.

TABLE 3

| | | | Performance Results | | |
|---|---|---|---|---|---|
| Structure | Sample No. | Bonding Strength | Heat Seal Strength (140° C.-1 s) | Heat Seal Strength (220° C.-0.5 s) | Mode of Failure in Heat Seal Test |
| VMPET/PE60 | CE1 | 2.62 | 31.2 | 27.5 | Lamination Tear |
| | IE1 | 2.52 | 31.6 | 34.7 | Lamination Rigid broken |
| | IE2 | 2.49 | 33.9 | 35.2 | Lamination Rigid broken |

As shown in Table 4, Illustrative Adhesive Examples IE1, IE2, IE3 and IE4 have significantly improved heat seal strength at 220° C., compared to those of Comparative Adhesive Examples CE1, CE2 and CE3.

TABLE 4

| | | Performance Results | | | | |
|---|---|---|---|---|---|---|
| | Sample | Bonding Strength | | Heat Seal Strength | | Mode of |
| Structure | No. | BOPP/VMPET | VMPET/PE | 140° C.-1 S HS | 220° C.-0.5 S HS | Failure in HS Test |
| BOPP/VMPET/PE60 | CE1 | 1.89 | 2.73 | 40.12 | 39.09 | Lamination Tear |
| | IE3 | 2.02 | 2.61 | 38.32 | 41.43 | Lamination Rigid Broken |
| | IE1 | 2.12 | 2.61 | 41.63 | 48.75 | Lamination Rigid Broken |
| | IE2 | 1.89 | 2.33 | 37.27 | 42.70 | Lamination Rigid Broken |
| | IE4 | 1.61 | 2.45 | 39.41 | 45.27 | Lamination Rigid broken |
| | CE2 | 1.90 | 2.62 | 39.12 | 37.78 | Lamination Rigid broken |
| | CE3 | 1.86 | 2.30 | 32.75 | 44.56 | Lamination Rigid Broken |

What is claimed is:

1. A laminate comprising:
   a first substrate that is a biaxially oriented polypropylene (BOPP) film;
   a second substrate that is a vacuum metallized casted polyethylene terephthalate polyester film (VMPET);
   a third substrate that is a polyethylene (PE) film;
   a composition consisting of
   (a) a first component that is an aqueous mixture with its solid portion consisting of
      (i) 0.1% to 10% of a polyol containing at least two hydroxyl groups and being selected from the group consisting of water dispersible polyether polyols, polyester polyols, polyether polyester polyols and mixtures thereof,
      (ii) 3% to 30% of a rosin resin, and
      (iii) from 65% to 96% of a polymer having from 23-45% residues of at least one styrene monomer, from 50-80% residues of at least one acrylic monomer having a Tg less than 0° C., and from 1.5% to 2.5% residues of (meth)acrylic acid; and
   (b) a second component consisting of a water dispersible polyisocyanate, wherein the second component is present relative to the first component at a NCO/NCO-reactive group molar ratio of 1:1 to 8:1; wherein the composition bonds the first substrate to the second substrate; and
   the composition bonds the second substrate to the third substrate.

2. The laminate according to claim 1, wherein the polymer has a weight average molecular weight of between 5,000 and 2,000,000.

3. The laminate according to claim 1, wherein the polyol is polypropylene glycol.

4. The laminate according to claim 1, wherein the polyol has a number average molecular weight from 100 to 7,500.

5. The laminate according to claim 1, wherein the rosin resin is selected from modified rosins, hydrogenated rosins, disproportionated rosins and polymerized rosins obtained respectively by modifying, hydrogenating, disproportionating and polymerizing raw material rosins, and rosin esters obtained by esterifying raw material rosins with alcohols or an epoxy compound.

6. The laminate according to claim 5, wherein the modified rosin resins are selected from unsaturated modified rosins obtained by modifying raw material rosins with unsaturated acid, and phenolic modified rosins obtained by modifying raw material rosins with phenols.

7. The laminate according to claim 6, wherein the unsaturated acids are acrylic acid, methacrylic acid, fumaric acid, and maleic acid.

8. The laminate according to claim 6, wherein the phenols are phenol and alkylphenol.

9. The laminate according to claim 5, wherein the alcohol is glycerin.

10. The laminate according to claim 5, wherein the alcohol is pentaerythritol.

11. The laminate according to claim 1, wherein the rosin resin has a molecular weight of from 1,000 to 50,000.

12. The laminate according to claim 1, wherein the rosin resin has an acid value of from 1 to 50 KOH mg/g.

13. The laminate according to claim 1, wherein the rosin resin has a softening point of from 25° C. to 200° C.

14. The laminate according to claim 1 wherein the polyisocyanate is selected from polyisocyanates based on toluene diisocyanate, isophorone diisocyanate, hexamethylene diisocyanate, diphenyl methane diisocyanate, dicyclohexyl methane diisocyanate, isomers thereof, and mixtures thereof.

15. A process for making the laminate of claim 1 wherein at least two substrate layers are bonded together by a layer of the bonding agent composition, comprising bonding said at least two substrate layers with the bonding agent composition.

16. The laminate of claim 4 1 wherein the polymer consists of from 23-45% residues of a styrene monomer, from 50-80% residues of an acrylic monomer having a Tg less than 0° C. that is butyl acrylate, and from 1.5% to 2.5% residues of acrylic acid.

17. The laminate of claim 16 wherein the polymer consists of 38% styrene monomer, 60% butyl acrylate, and 2% acrylic acid.

18. The laminate of claim 16 wherein the composition consists of
(a)(i) from 1% to 1.8% of a polyether diol,
(a)(ii) from 5% to 30% of the rosin resin,
(a)(iii) from 68.6% to 94% of the polymer; and
(b) 2% of the second component.

19. A laminate consisting of:
a first substrate that is a biaxially oriented polypropylene (BOPP) film;
a second substrate that is a vacuum metallized casted polyethylene terephthalate polyester film (VMPET);
a third substrate that is a polyethylene (PE) film;
a composition consisting of
(a) a first component that is an aqueous mixture with its solid portion consisting of
  (i) 0.1% to 10% of a polyol containing at least two hydroxyl groups and being selected from the group consisting of water dispersible polyether polyols, polyester polyols, polyether polyester polyols and mixtures thereof,
  (ii) 3% to 30% of a rosin resin, and
  (iii) from 65% to 96% of a polymer having from 23-45% residues of at least one styrene monomer, from 50-80% residues of at least one acrylic monomer having a Tg less than 0° C., and from 1.5% to 2.5% residues of (meth)acrylic acid; and
(b) a second component consisting of a water dispersible polyisocyanate, wherein the second component is present relative to the first component at a NCO/NCO-reactive group molar ratio of 1:1 to 8:1; wherein the composition bonds the first substrate to the second substrate; and
the composition bonds the second substrate to the third substrate.

* * * * *

UNITED STATES PATENT AND TRADEMARK OFFICE
CERTIFICATE OF CORRECTION

| | | |
|---|---|---|
| PATENT NO. | : 11,939,498 B2 | Page 1 of 1 |
| APPLICATION NO. | : 16/604368 | |
| DATED | : March 26, 2024 | |
| INVENTOR(S) | : Chen et al. | |

It is certified that error appears in the above-identified patent and that said Letters Patent is hereby corrected as shown below:

In the Claims

Claim 16 - Column 11, Line 26, Replace "claim 4 1" with --claim 1--

Signed and Sealed this
Nineteenth Day of November, 2024

*Katherine Kelly Vidal*

Katherine Kelly Vidal
*Director of the United States Patent and Trademark Office*